(12) United States Patent
Okano et al.

(10) Patent No.: US 6,931,508 B2
(45) Date of Patent: Aug. 16, 2005

(54) DEVICE AND METHOD FOR INFORMATION PROCESSING

(75) Inventors: Hiroshi Okano, Kawasaki (JP); Fumihiko Hayakawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 230 days.

(21) Appl. No.: 10/318,115

(22) Filed: Dec. 13, 2002

(65) Prior Publication Data

US 2003/0126402 A1 Jul. 3, 2003

(30) Foreign Application Priority Data

Dec. 28, 2001 (JP) ........................................ 2001-399389

(51) Int. Cl.[7] ............................................. G06F 12/00
(52) U.S. Cl. ........................ 711/201; 711/214; 711/217; 711/220; 365/230.03; 365/236; 365/238.5
(58) Field of Search ........................... 365/230.03, 236, 365/238.5; 710/4; 711/3, 5, 201, 212, 213, 214, 217, 219, 220

(56) References Cited

U.S. PATENT DOCUMENTS

| | | | | |
|---|---|---|---|---|
| 5,168,557 A | * | 12/1992 | Shibuya | 712/207 |
| 5,499,380 A | * | 3/1996 | Iwata et al. | 711/212 |
| 5,590,302 A | * | 12/1996 | Tanaka | 711/206 |
| 5,813,045 A | * | 9/1998 | Mahalingaiah et al. | 711/204 |
| 6,502,177 B1 | * | 12/2002 | Douglas et al. | 711/200 |
| 2002/0112126 A1 | * | 8/2002 | Hayakawa et al. | 711/128 |

FOREIGN PATENT DOCUMENTS

EP  0 322 880  12/1988

OTHER PUBLICATIONS

European Search Report.
"Method for Handling Unaligned Operands That Extend Across Memory Protection Boundaries in a Microprocessor" IBM Technical Disclosure Bulletin, IBM Corp. New York, US, vol. 37, No. 4B, Apr. 1, 1994, pp 597–598.

* cited by examiner

Primary Examiner—Christian P. Chace
(74) Attorney, Agent, or Firm—Arent Fox PLLC

(57) ABSTRACT

In an information processing device, a first address adder generates a first address representing a target for write of data or a storage location of data to be read. A second address adder generates a second address by adding 8 to the first address. First to seventh selectors appropriately select either the first address or the second address, and supply the selected address to first to seventh memory areas, respectively. An eighth memory area is supplied with the first address.

6 Claims, 8 Drawing Sheets

| OUTPUT OF [2.0] OF ADDER 1 | ACCESS SIZE | OUTPUT OF SELECTOR 1 | OUTPUT OF SELECTOR 2 | OUTPUT OF SELECTOR 3 | OUTPUT OF SELECTOR 4 | OUTPUT OF SELECTOR 5 | OUTPUT OF SELECTOR 6 | OUTPUT OF SELECTOR 7 | OUTPUT OF [7.0] OF WRITE CONTROL CIRCUIT |
|---|---|---|---|---|---|---|---|---|---|
| 000 | Byte | 1 | 1 | 1 | 1 | 1 | 1 | 1 | 10000000 |
|  | Half word | 1 | 1 | 1 | 1 | 1 | 1 | 1 | 11000000 |
|  | Word | 1 | 1 | 1 | 1 | 1 | 1 | 1 | 11110000 |
|  | Double word | 1 | 1 | 1 | 1 | 1 | 1 | 1 | 11111111 |
| 001 | Byte | 2 | 1 | 1 | 1 | 1 | 1 | 1 | 01000000 |
|  | Half word | 2 | 1 | 1 | 1 | 1 | 1 | 1 | 01100000 |
|  | Word | 2 | 1 | 1 | 1 | 1 | 1 | 1 | 01111000 |
|  | Double word | 2 | 1 | 1 | 1 | 1 | 1 | 1 | 11111111 |
| 010 | Byte | 2 | 2 | 1 | 1 | 1 | 1 | 1 | 00100000 |
|  | Half word | 2 | 2 | 1 | 1 | 1 | 1 | 1 | 00110000 |
|  | Word | 2 | 2 | 1 | 1 | 1 | 1 | 1 | 00111100 |
|  | Double word | 2 | 2 | 1 | 1 | 1 | 1 | 1 | 11111111 |
| 011 | Byte | 2 | 2 | 2 | 1 | 1 | 1 | 1 | 00010000 |
|  | Half word | 2 | 2 | 2 | 1 | 1 | 1 | 1 | 00011000 |
|  | Word | 2 | 2 | 2 | 1 | 1 | 1 | 1 | 00011110 |
|  | Double word | 2 | 2 | 2 | 1 | 1 | 1 | 1 | 11111111 |
| 100 | Byte | 2 | 2 | 2 | 2 | 1 | 1 | 1 | 00001000 |
|  | Half word | 2 | 2 | 2 | 2 | 1 | 1 | 1 | 00001100 |
|  | Word | 2 | 2 | 2 | 2 | 1 | 1 | 1 | 00001111 |
|  | Double word | 2 | 2 | 2 | 2 | 1 | 1 | 1 | 11111111 |
| 101 | Byte | 2 | 2 | 2 | 2 | 2 | 1 | 1 | 00000100 |
|  | Half word | 2 | 2 | 2 | 2 | 2 | 1 | 1 | 00000110 |
|  | Word | 2 | 2 | 2 | 2 | 2 | 1 | 1 | 10000111 |
|  | Double word | 2 | 2 | 2 | 2 | 2 | 1 | 1 | 11111111 |
| 110 | Byte | 2 | 2 | 2 | 2 | 2 | 2 | 1 | 00000010 |
|  | Half word | 2 | 2 | 2 | 2 | 2 | 2 | 1 | 00000011 |
|  | Word | 2 | 2 | 2 | 2 | 2 | 2 | 1 | 11000011 |
|  | Double word | 2 | 2 | 2 | 2 | 2 | 2 | 1 | 11111111 |
| 111 | Byte | 2 | 2 | 2 | 2 | 2 | 2 | 2 | 00000001 |
|  | Half word | 2 | 2 | 2 | 2 | 2 | 2 | 2 | 10000001 |
|  | Word | 2 | 2 | 2 | 2 | 2 | 2 | 2 | 11100001 |
|  | Double word | 2 | 2 | 2 | 2 | 2 | 2 | 2 | 11111111 |

(PRIOR ART)

FIG.2

| Size | Address | | |
|---|---|---|---|
| | [2] | [1] | [0] |
| Byte | X | X | X |
| Half word | X | X | 0 |
| Word | X | 0 | 0 |
| Double word | 0 | 0 | 0 |

X: Don't care
0: Zero

FIG.7

| OUTPUT OF [2:0] OF ADDER 1 | ACCESS SIZE | OUTPUT OF SELECTOR 1 | OUTPUT OF SELECTOR 2 | OUTPUT OF SELECTOR 3 | OUTPUT OF SELECTOR 4 | OUTPUT OF SELECTOR 5 | OUTPUT OF SELECTOR 6 | OUTPUT OF SELECTOR 7 | OUTPUT OF [7:0] OF WRITE CONTROL CIRCUIT |
|---|---|---|---|---|---|---|---|---|---|
| 000 | Byte | 1 | 1 | 1 | 1 | 1 | 1 | 1 | 10000000 |
|  | Half word | 1 | 1 | 1 | 1 | 1 | 1 | 1 | 11000000 |
|  | Word | 1 | 1 | 1 | 1 | 1 | 1 | 1 | 11110000 |
|  | Double word | 1 | 1 | 1 | 1 | 1 | 1 | 1 | 11111111 |
| 001 | Byte | 2 | 1 | 1 | 1 | 1 | 1 | 1 | 01000000 |
|  | Half word | 2 | 1 | 1 | 1 | 1 | 1 | 1 | 01100000 |
|  | Word | 2 | 1 | 1 | 1 | 1 | 1 | 1 | 01111000 |
|  | Double word | 2 | 1 | 1 | 1 | 1 | 1 | 1 | 11111111 |
| 010 | Byte | 2 | 2 | 1 | 1 | 1 | 1 | 1 | 00100000 |
|  | Half word | 2 | 2 | 1 | 1 | 1 | 1 | 1 | 00110000 |
|  | Word | 2 | 2 | 1 | 1 | 1 | 1 | 1 | 00111100 |
|  | Double word | 2 | 2 | 1 | 1 | 1 | 1 | 1 | 11111111 |
| 011 | Byte | 2 | 2 | 2 | 1 | 1 | 1 | 1 | 00010000 |
|  | Half word | 2 | 2 | 2 | 1 | 1 | 1 | 1 | 00011000 |
|  | Word | 2 | 2 | 2 | 1 | 1 | 1 | 1 | 00011110 |
|  | Double word | 2 | 2 | 2 | 1 | 1 | 1 | 1 | 11111111 |
| 100 | Byte | 2 | 2 | 2 | 2 | 1 | 1 | 1 | 00001000 |
|  | Half word | 2 | 2 | 2 | 2 | 1 | 1 | 1 | 00001100 |
|  | Word | 2 | 2 | 2 | 2 | 1 | 1 | 1 | 00001111 |
|  | Double word | 2 | 2 | 2 | 2 | 1 | 1 | 1 | 11111111 |
| 101 | Byte | 2 | 2 | 2 | 2 | 2 | 1 | 1 | 00000100 |
|  | Half word | 2 | 2 | 2 | 2 | 2 | 1 | 1 | 00000110 |
|  | Word | 2 | 2 | 2 | 2 | 2 | 1 | 1 | 10000111 |
|  | Double word | 2 | 2 | 2 | 2 | 2 | 1 | 1 | 11111111 |
| 110 | Byte | 2 | 2 | 2 | 2 | 2 | 2 | 1 | 00000010 |
|  | Half word | 2 | 2 | 2 | 2 | 2 | 2 | 1 | 00000011 |
|  | Word | 2 | 2 | 2 | 2 | 2 | 2 | 1 | 11000011 |
|  | Double word | 2 | 2 | 2 | 2 | 2 | 2 | 1 | 11111111 |
| 111 | Byte | 2 | 2 | 2 | 2 | 2 | 2 | 2 | 00000001 |
|  | Half word | 2 | 2 | 2 | 2 | 2 | 2 | 2 | 10000001 |
|  | Word | 2 | 2 | 2 | 2 | 2 | 2 | 2 | 11100001 |
|  | Double word | 2 | 2 | 2 | 2 | 2 | 2 | 2 | 11111111 |

DEVICE AND METHOD FOR INFORMATION PROCESSING

CROSS-REFERENCE TO RELATED APPLICATIONS

This application is based upon and claims priority of Japanese Patent Application No. 2001-399389, filed in Dec. 28, 2001, the contents being incorporated herein by reference.

BACKGROUND OF THE INVENTION

1) Field of the Invention

The present invention relates to an information processing device such as a microprocessor or a digital signal processor having a cache memory or a memory, and an information processing method. More particularly, this invention relates to a technology preferably applied to data reading and data writing from and to a cache memory or other memories in an image processor or the like.

2) Description of the Related Art

In the microprocessor, or the digital signal processor (hereinafter, called simply as an information processing device), data to be processed is read from the cache memory or the memory such as a random access memory (RAM) and a read-only memory (ROM) for processing at data processing. After completion of the processing, data as a result of the processing is written in the cache memory or the memory. In such a case, the address and the size of data to be processed are specified, and the data which starts from the specified address is read. Then, the data is written in an area for the specified size starting from the specified address.

A configuration for data reading or data writing in a conventional information processing device will be described with reference to an example of a cache memory which has a read or write size in a range between a maximum 64-bit width and a minimum 8-bit one, and a capacity of 8 kilobytes according to a direct map method. Here, read and write bus widths are assumed to be 8 bytes, that is, 64 bits.

FIG. 1 is a block diagram showing a configuration for data reading or data writing in such a conventional cache memory. As shown in FIG. 1, target base addresses and offsets to write data are stored into a first register 11 (register 1) and a second register 12 (register 2), respectively, in the conventional information processing device at data writing. Further, the size of the write data is stored into a third register 13 (register 3).

The base addresses and the offsets stored in the first register 11 and the second register 12 are added in an address adder 14, whereby an address of [12:0] representing a target address for write is generated. Here, in the present specification, [a:b] represents data having a width of (a−b+1) bits, from (b+1)th bit to (a+1)th bit where a and b are integers equal to or larger than zero. In the address of [12:0] output from the address adder 14, low-order 3 bits represented by [2:0] are supplied to a write control circuit 15, and the remaining 10 bits of [12:3], that is, the 10 bits of the fourth bit to the 13th bit are supplied to a memory 16.

Data sizes are supplied from the third register 13 into the write control circuit 15, and write control signals of [7:0] are generated based on the low-order bits in the address of [2:0] supplied from the address adder 14. One-bit write control signals of [0] to [7] corresponding to individual eight memory areas with a width of 8 bits in the memory 16 are supplied to the memory areas, respectively, and data to be written in the memory ("memory write data") 17 are written in the memory areas specified by the respective control signals. Here, when c is an integer equal to or larger than zero, [c] represents data of the (c+1)th bit from the least significant bit (LSB).

The address of [12:3] is, at data reading, supplied to the memory 16 from the address adder 14 in a similar manner to that at the data writing, based on the base addresses and the offsets respectively stored in the first register 11 and the second register 12. Further, data of a predetermined size, for example, 32 bits in the case Word unit, and 64 bits in the case Double word unit, are read from the memory 16 as data read from the memory ("memory read data") 18.

Incidentally, when the addresses are aligned, at data writing or data reading, differently from those according to the sizes of data to be written in the memory 16 or the sizes of data to be read from the memory 16, data reading or writing can not be executed in hardware of the conventional information processing device. Therefore, exception is detected to cause the processing to be interrupted. Alternatively, the addresses are required in software to be aligned according to the sizes of the data so that no interruption of the processing occurs.

When addresses are aligned according to the size of the specified data as shown in FIG. 2, the values of any bits are not cared when the specified size is Byte in the low-order bits in the address of [2:0]. Further, only the value of the bit of [0] is required to be zero when the specified size is Half word. Moreover, the values of bits of [1] and [0] are required to be zero when the specified size is Word. In addition, the values of all the bits are required to be zero when the specified size is Double word. Therefore, the case where the addresses are aligned differently from those according to the size of the specified data indicates a case where the conditions shown in FIG. 2 are not met.

For example, as shown in FIG. 3, when the address of data to be read or written is 32'h00000015 and the specified data size is of 8 bytes, the value of a bit of [2] in the address is 1, that of a bit of [1] is zero, and that of a bit of [0] is 1. The above states do not meet the conditions that are required as shown in FIG. 2 when the data size is of 8 bytes. Accordingly, the example shown in FIG. 3 signifies that the addresses are not aligned with respect to the data size of 8 bytes. In such a case, the 8-byte addresses starting from an address of 32'h00000015 cross over an 8-byte boundary set in the memory.

In the example in FIG. 3, the 8-byte boundary includes, for example, a boundary between 32'h00000007 and 32'h00000008, that between 32'h0000000F and 32'h00000010, and that between 32'h00000017 and 32'h00000018.

Generally, addresses for data reading or data writing are apparent only at execution of software. Therefore, the conventional information processing device has had a problem that longer processing time for data reading or data writing is required when the addresses of data to be read or written are not aligned as described above, because reading or writing of data with a 1-byte size as a minimum unit is required to be executed eight times when the data size is of 8 bytes.

SUMMARY OF THE INVENTION

It is an object of this invention to provide a device and a method for information processing by which data reading or data writing can be executed by one-time memory access even when addresses are aligned differently from those according to the size of data specified at the data reading or the data writing.

To achieve the object, the information processing device according to one aspect of this invention has the following configuration. As shown in FIG. 4, a memory consists of N memory areas 141 to 144 and has a M×N-bit write width (M and N are natural numbers). A first address adder 124 (adder 1) generates target addresses for writing of data based on values stored in a first register 121 (register 1) and a second register 122 (register 2) Further, a second address adder 134 (adder 2) generates addresses by adding N to the generated target addresses.

A first to a (N−1)th selectors 151 to 153 provided before the first to the (N−1)th memory areas 141 to 143 select either the address generated in the first address adder 124, or the address generated in the second address adder 134, and supplies the selected address to the memory areas 141 to 143, respectively. Moreover, the address generated in the first address adder 124 is supplied to an Nth memory area 144. A write control circuit 125 generates write control signals based on the data sizes stored in a third register 123 (register 3), and the address generated by the first address adder 124 is supplied to each memory area 141 to 144.

According to this invention, even when the size of write data crosses over an M×N boundary, necessary data can be written at one-time memory-access by switching the addresses to be supplied into the memory corresponding to the target addresses for write and the sizes of the write data.

To achieve the object, the information processing device according to another aspect of this invention has the following configuration. As shown in FIG. 5, a memory consists of N memory areas 141 to 144 and has a M×N-bit read width (M and N are natural numbers). The first address adder 124 generates addresses in which read data is stored based on values stored in the first register 121 and the second register 122. Further, the second address adder 134 generates addresses by adding N to the generated addresses.

The first to the (N−1)th selectors 151 to 153 provided before the first to the (N−1)th memory areas 141 to 143 select either the address generated in the first address adder 124, or the address generated in the second address adder 134, and supplies the selected address to the memory areas 141 to 143, respectively. Moreover, the address generated by the first address adder 124 is supplied to an Nth memory area 144.

According to this invention, even when the size for data reading crosses over an M×N boundary, necessary data can be read at one-time memory-access by switching the addresses to be supplied into the memory corresponding to the addresses of storage locations and the sizes of the data to be read.

These and other objects, features and advantages of the present invention are specifically set forth in or will become apparent from the following detailed descriptions of the invention when read in conjunction with the accompanying drawings.

BRIEF DESCRIPTION OF THE DRAWINGS

FIG. 2 is a table showing relations between the values of low-order bits in addresses and data sizes in the conventional information processing device when the addresses are aligned according to a specified data size, FIG. 7 is a table showing truth values of various kinds of signals in the information processing device according to the embodiment.

DETAILED DESCRIPTION

Embodiments of the present invention will be described in detail below with reference to the drawings. The description will be given, for convenience, by taking up an example of a cache memory that has a read or write size of a range between a maximum 64-bit width and a minimum 8-bit one, and a capacity of 8 kilobytes according to a direct map method, but the present invention is not limited to the above example. Here, the cache memory is composed of eight memory areas with a width of 8 bits, and has a memory space, for example, shown in FIG. 3. Moreover, a address space is assumed to be of 32 bits, and the read and write bus-width is assumed to be of 8 bytes.

Figure 6:
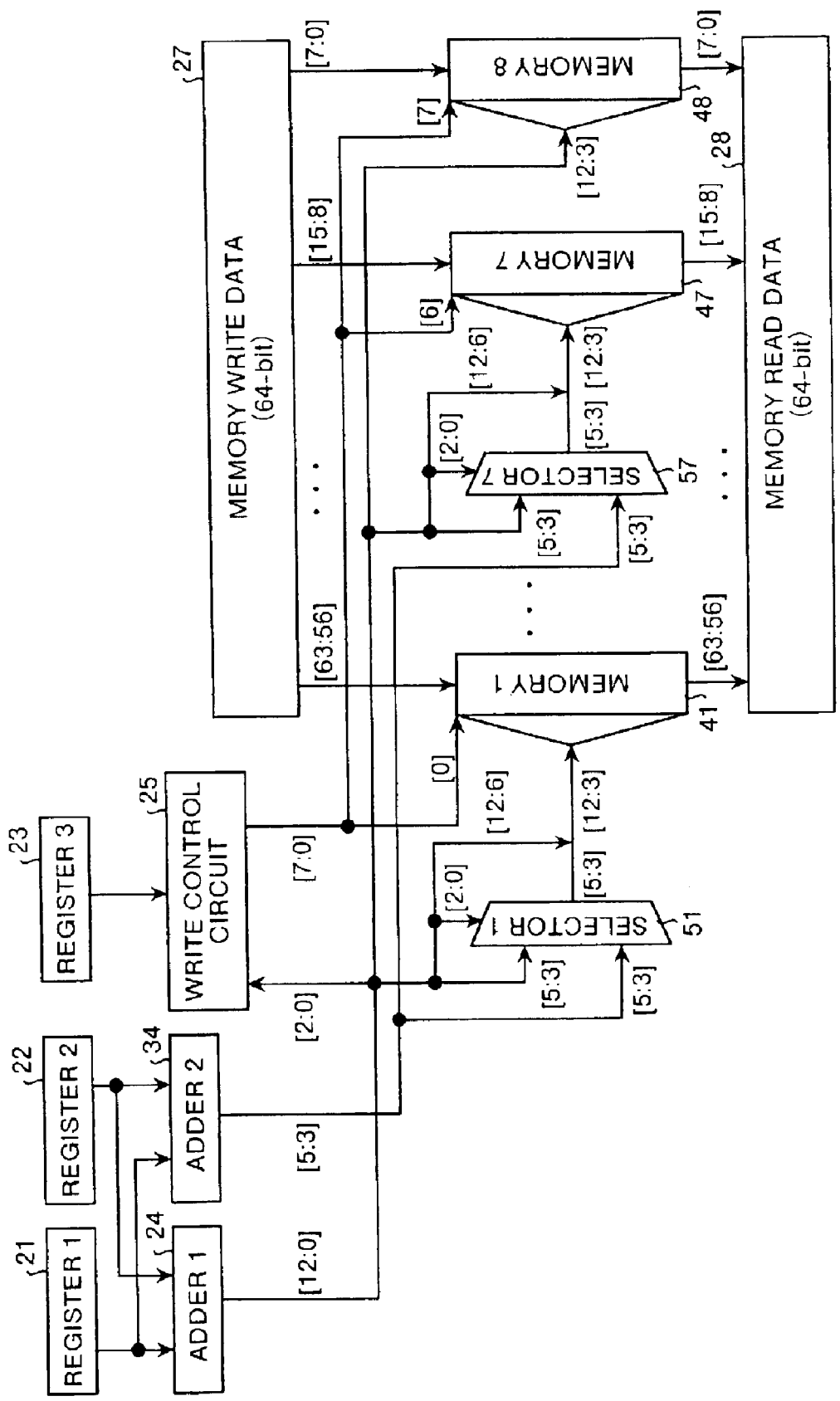
FIG. 6 is a block diagram showing a configuration for data reading or data writing in the information processing device according to an embodiment of the present invention.

FIG. 6 is a block diagram showing a configuration for data reading or data writing in an information processing device according to an embodiment of the present invention. As shown in FIG. 6, the information processing device comprises first to third registers 21, 22, 23, first and second address adders 24, 34, a write control circuit 25, eight memory areas 41 to 47 and 48, and seven selectors 51 to 57. Here, five memory areas and five selectors are omitted in FIG. 6.

An address representing a storage location of read data and an address representing a target address for write of data are obtained, based on values stored in the first register 21 (register 1) and the second register 22 (register 2). For example, the first register 21 stores abase address for the address representing the storage location of the read data, or a base address for the address representing the target for write of the data. Further, for example, the second register 22 stores offsets from the base addresses. The third register 23 (register 3) stores the sizes of write data.

The first address adder 24 (adder 1) adds the value stored in the first register 21 and the value stored in the second register 22 to generate an address indicating a storage location of read data, or an address indicating a target for write of data. The values of low-order 3 bits of [2:0] in a 13-bit address of [12:0] generated in the first address adder 24 are supplied to the write control circuit 25, and the selectors 51 to 57. The values of subsequent low-order 3 bits of [5:3] are supplied to the selectors 51 to 57. Moreover, the values of 10 bits of [12:3], of the address generated by the first address adder 24, are supplied to the eighth memory area 48.

The second address adder 34 adds the values stored in the first register 21 and the values stored in the second register 22, and further adds 8 to the addition result. That is, an address obtained by adding 8 to the address generated in the first address adder 24 is generated. Only the values of bits of [5:3] in the address generated by the second address adder 34 is supplied to the selectors 51 to 57.

Each of the selectors 51 to 57 selects either the values of bits of [5:3] supplied from the first address adder 24, or those of bits of [5:3] supplied from the second address adder 34 to output the selected values. In such a case, the selectors 51 to 57 select the above values, based on the values of the bits of [2:0] supplied from the first address adder 24. The values of bits of [5:3] which have been output from the selectors 51 to 57 are combined with the values of high-order 7 bits of

[12:6], of the addresses generated by the first address adder 24 is supplied as 10-bit address of [12:3] to the first to the seventh memory areas 41 to 47.

It has been assumed that the address space is of 32 bits, but high-order bits of [31:13] of the address are not always necessary, and 10 bits of [12:3] are enough because the first to the eighth memory areas 41 to 48 form the cache memory.

The write control circuit 25 generates a write control signals of [7:0] for the first to the eighth memory areas 41 to 48, based on the size of write data supplied from the third register 23 and the values of bits of [2:0] supplied from the first address adder 24. The write control signal of each bit of [0] to [7] forming [7:0] is supplied to each of corresponding memory areas 41 to 48, respectively. In each of the memory areas 41 to 48 at data writing, memory write data 27 of [63:0] is written into the above address of [12:3], based on the write control signals supplied from the write control circuit 25. On the other hand, at data reading, data of a predetermined size, for example, of 64 bits is read from the above-described address of [12:3] as memory read data 28.

Subsequently, relations among the values of bits of [2:0] output from the first address adder 24, a memory access size (specified size), outputs of the first to the seventh selector 51 to 57, and the values of the write control signals of [7:0] output from the write control circuit 25, will be described below.

FIG. 7 is a table showing the above relations. The access size includes Byte (8 bits), Half word (16 bits), Word (32 bits), and Double word (64 bits). In FIG. 7, fields of "Output of selector 1" to "Output of selector 7" represent that the first to the seventh selectors 51 to 57 select either [5:3] supplied from the first address adder 24 or [5:3] supplied from the second address adder 34, respectively. "1" shows that the output of the first address adder 24 is selected, and "2" shows that the output of the second address adder 34 is selected. Furthermore, data is written into memory areas corresponding to the bit of "1" in the field of "Output [7:0] of write control circuit".

When all the values of bits of [2:0] output from the first address adder 24 are zero, all the selectors 51 to 57 select the values of [5:3] which have been supplied by the first address adder 24. Further, when the access size is Byte, only the value of a bit of [7] becomes 1, and the values of each bit of [6] to [0] become zero with regard to the write control signal. Accordingly, referring to the example in FIG. 3, 1-byte memory write data 27 are written into 1-byte address locations starting from an address of 32'h00000000, 32'h00000008, 32'h00000010, or 32'h00000018 (hereinafter, called as an address such as 32'h00000000). Alternatively, data corresponding to consecutive 8-byte address locations starting from an address such as 32'h00000000 is read as memory read data 28. In the above data, 1-byte data starting from an address such as 32'h00000000 is actually used for processing in a processor.

When the access size is of the half word, only the values of bits of [7] and [6] become 1, and the values of each bit of [5] to [0] become zero with regard to the write control signal. Therefore, referring to the example in FIG. 3, 2-byte memory write data 27 are written into consecutive 2-byte address locations starting from an address such as 32'h00000000.

At data reading, data corresponding to consecutive 8-byte address locations starting from an address such as 32'h00000000 is read as memory read data 28. In the above data, consecutive 2-byte data starting from an address such as 32'h00000000 is actually used for processing in the processor.

When the access size is Word, the values of each bit of [7] to [4] become 1, and the values of each bit of [3] to [0] become zero with regard to the write control signal. Therefore, referring to the example in FIG. 3, 4-byte memory write data 27 are written into consecutive 4-byte address locations starting from an address such as 32'h00000000.

At data reading, data corresponding to consecutive 8-byte address locations starting from an address such as 32'h00000000 is read as memory read data 28. In the above data, consecutive 4-byte data starting from an address such as 32'h00000000 are actually used for processing in the processor.

When the access size is Double word, the values of all the bits of [7] to [0] become 1 with regard to the write control signal. Therefore, referring to the example in FIG. 3, 8-byte memory write data 27 are written into consecutive 8-byte address locations starting from an address such as 32'h00000000.

At data reading, data corresponding to consecutive 8-byte address locations starting from an address such as 32'h00000000 are read as memory read data 28, and are used for processing in the processor.

When, in 3 bits of [2:0] which have been output from the first address adder 24, only the value of a bit of [0] is 1 and the values of the other bits are zero, only the first selector 51 selects the values of [5:3] supplied from the second address adder 34, and the second selector to the seventh selector 57 select the values of [5:3] supplied from the first address adder 24. Further, when the access size is Byte, only the value of a bit of [6] becomes 1, and the values of the other bits become zero with regard to the write control signal. Accordingly, referring to the example in FIG. 3, 1-byte memory write data 27 are written into 1-byte address locations starting from an address such as 32'h00000001, 32'h00000009, 32'h00000011, or 32'h00000019 (hereinafter, called as an address such as 32'h00000001).

At data reading, 8-byte data are read as memory read data 28. More specifically, the 8-byte data correspond to consecutive 7-byte address locations starting from an address such as 32'h00000001 and 1-byte address locations of an address such as 32'h0000000 that are determined by the next base address after an 8-byte boundary set in the memory. In the above data, 1-byte data starting from an address such as 32'h00000001 are used for processing in the processor.

When the access size is Half word, only the values of bits of [6] and [5] become 1, and the values of the other bits become zero with regard to the write control signal. Therefore, referring to the example in FIG. 3, 2-byte memory write data 27 are written into 2-byte address locations starting from an address such as 32'h00000001.

At data reading, 8-byte data are read as memory read data 28. More specifically, the 8-byte data correspond to consecutive 7-byte address locations starting from an address such as 32'h00000001 and 1-byte address locations of an address such as 32'h00000000 that are determined by the next base address after the 8-byte boundary set in the memory. In the above data, 2-byte data starting from an address such as 32'h00000001 are used for processing in the processor.

When the access size is Word, the values of each bit of [6] to [3] become 1, and the values of the other bits become zero with regard to the write control signal. Therefore, referring to the example in FIG. 3, 4-byte memory write data 27 are written into 4-byte address locations starting from an address such as 32'h00000001.

At data reading, 8-byte data are read as memory read data 28. More specifically, the 8-byte data correspond to consecutive 7-byte address locations starting from an address such as 32'h00000001 and 1-byte address locations of an address such as 32'h00000000 that are determined by the next base address after the 8-byte boundary set in the memory. In the above data, 4-byte data starting from an address such as 32'h00000001 are used for processing in the processor.

When the access size is Double word, the values of all the bits of [7] to [0] become 1 with regard to the write control signal. Therefore, referring to the example in FIG. 3, 8-byte memory write data 27 are written into consecutive 7-byte address locations starting from an address such as 32'h00000001 and 1-byte address locations of an address such as 32'h00000000, which are determined by the next base addresses after the 8-byte boundary set in the memory.

At data reading, 8-byte data are read as memory read data 28. More specifically, the 8-byte data correspond to consecutive 7-byte address locations starting from an address such as 32'h00000001 and 1-byte address locations of an address such as 32'h00000000 that are determined by the next base address after the 8-byte boundary set in the memory, and the read data are used for processing in the processor.

When, in 3 bits of [2:0] which have been output from the first address adder 24, only the value of a bit of [1] is 1, and the values of the other bits are zero, the first selector 51 and the second selector select the values of [5:3] supplied from the second address adder 34, and the third to the sixth selectors, and the seventh selector 57 select the values of [5:3] supplied from the first address adder 24. Further, when the access size is Byte, only the value of a bit of [5] becomes 1, and the values of the other bits become zero with regard to the write control signal. Accordingly, referring to the example in FIG. 3, 1-byte memory write data 27 are written into 1-byte address locations starting from an address such as 32'h00000002, 32'h0000000A, 32'h00000012, or 32'h0000001A (hereinafter, called as an address of 32'h00000002).

At data reading, 8-byte data are read as memory read data 28. More specifically, the 8-byte data correspond to consecutive 6-byte address locations starting from an address such as 32'h00000002, and consecutive 2-byte address locations starting from an address such as 32'h00000000 that are determined by the next base address after the 8-byte boundary set in the memory. In the above data, 1-byte data starting from an address such as 32'h00000002 are used for processing in the processor.

When the access size is Half word, only the values of bits of [5] and [4] become 1, and the values of the other bits become zero with regard to the write control signal. Accordingly, referring to the example in FIG. 3, 2-byte memory write data 27 are written into 2-byte address locations starting from an address such as 32'h00000002.

At data reading, 8-byte data are read as memory read data 28. More specifically, the 8-byte data correspond to consecutive 6-byte address locations starting from an address such as 32'h00000002, and consecutive 2-byte address locations starting from an address such as 32'h00000000 that are determined by the next base address after the 8-byte boundary set in the memory. In the above data, 2-byte data starting from an address such as 32'h00000002 are used for processing in the processor.

When the access size is Word, the values of each bit of [5] to [2] become 1, and the values of the other bits become zero with regard to the write control signal. Accordingly, referring to the example in FIG. 3, 4-byte memory write data 27 are written into consecutive 4-byte address locations starting from an address such as 32'h00000002.

At data reading, 8-byte data are read as memory read data 28. More specifically, the 8-byte data correspond to consecutive 6-byte address locations starting from an address such as 32'h00000002, and consecutive 2-byte address locations starting from an address such as 32'h00000000 that are determined by the next base address after the 8-byte boundary set in the memory. In the above data, 4-byte data starting from an address such as 32'h00000002 are used for processing in the processor.

When the access size is Double word, the values of all the bits of [7] to [0] become 1 with regard to the write control signal. Therefore, referring to the example in FIG. 3, 8-byte memory write data 27 are written into consecutive 6-byte address locations starting from an address such as 32'h00000002, and consecutive 2-byte address locations starting from an address such as 32'h00000000 that are determined by the next base address after the 8-byte boundary set in the memory.

At data reading, 8-byte data are read as memory read data 28. More specifically, the 8-byte data correspond to consecutive 6-byte address locations starting from an address such as 32'h00000002, and consecutive 2-byte address locations starting from an address such as 32'h00000000 that are determined by the next base address after the 8-byte boundary set in the memory, and are used for processing in the processor.

When, in 3 bits of [2:0] which have been output from the first address adder 24, the values of bits of [1] and [0] are 1, and the values of the other bits are zero, the first selector 51, the second selector, and the third selector select the values of [5:3] supplied from the second address adder 34, and the fourth to the sixth selectors, and the seventh selector 57 select the values of [5:3] supplied from the first address adder 24. Further, when the access size is Byte, only the value of a bit of [4] becomes 1, and the values of the other bits become zero with regard to the write control signal. Accordingly, referring to the example in FIG. 3, 1-byte memory write data 27 are written into 1-byte address locations starting from an address such as 32'h00000003, 32'h0000000B, 32'h00000013, or 32'h0000001B (hereinafter, called as an address such as 32'h00000003).

At data reading, 8-byte data are read as memory read data 28. More specifically, the 8-byte data correspond to consecutive 5-byte address locations starting from an address such as 32'h00000003, and consecutive 3-byte address locations starting from an address such as 32'h00000000 that are determined by the next base address after the 8-byte boundary set in the memory. In the above data, 1-byte data starting from an address such as 32'h00000003 are used for processing in the processor.

When the access size is Half word, the values of all the bits of [4] and [3] become 1, and the values of the other bits become zero with regard to the write control signal. Accordingly, referring to the example in FIG. 3, 2-byte memory write data 27 are written into consecutive 2-byte address locations starting from an address such as 32'h00000003.

At data reading, 8-byte data are read as memory read data 28. More specifically, the 8-byte data correspond to consecutive 5-byte address locations starting from an address such as 32'h00000003, and consecutive 3-byte address locations starting from an address such as 32'h00000000 that are determined by the next base address after the 8-byte boundary set in the memory. In the above data, 2-byte data starting from an address such as 32'h00000003 are used for processing in the processor.

When the access size is Word, the values of each bit of [4] to [1] become 1, and the values of the other bits become zero with regard to the write control signal. Accordingly, referring to the example in FIG. 3, 4-byte memory write data 27 are written into consecutive 4-byte address locations starting from an address such as 32'h00000003.

At data reading, 8-byte data are read as memory read data 28. More specifically, the 8-byte data correspond to consecutive 5-byte address locations starting from an address such as 32'h00000003, and consecutive 3-byte address locations of an address such as 32'h00000000 that are determined by the next base address after the 8-byte boundary set in the memory. In the above data, 4-byte data starting from an address such as 32'h00000003 are used for processing in the processor.

Figure 1:
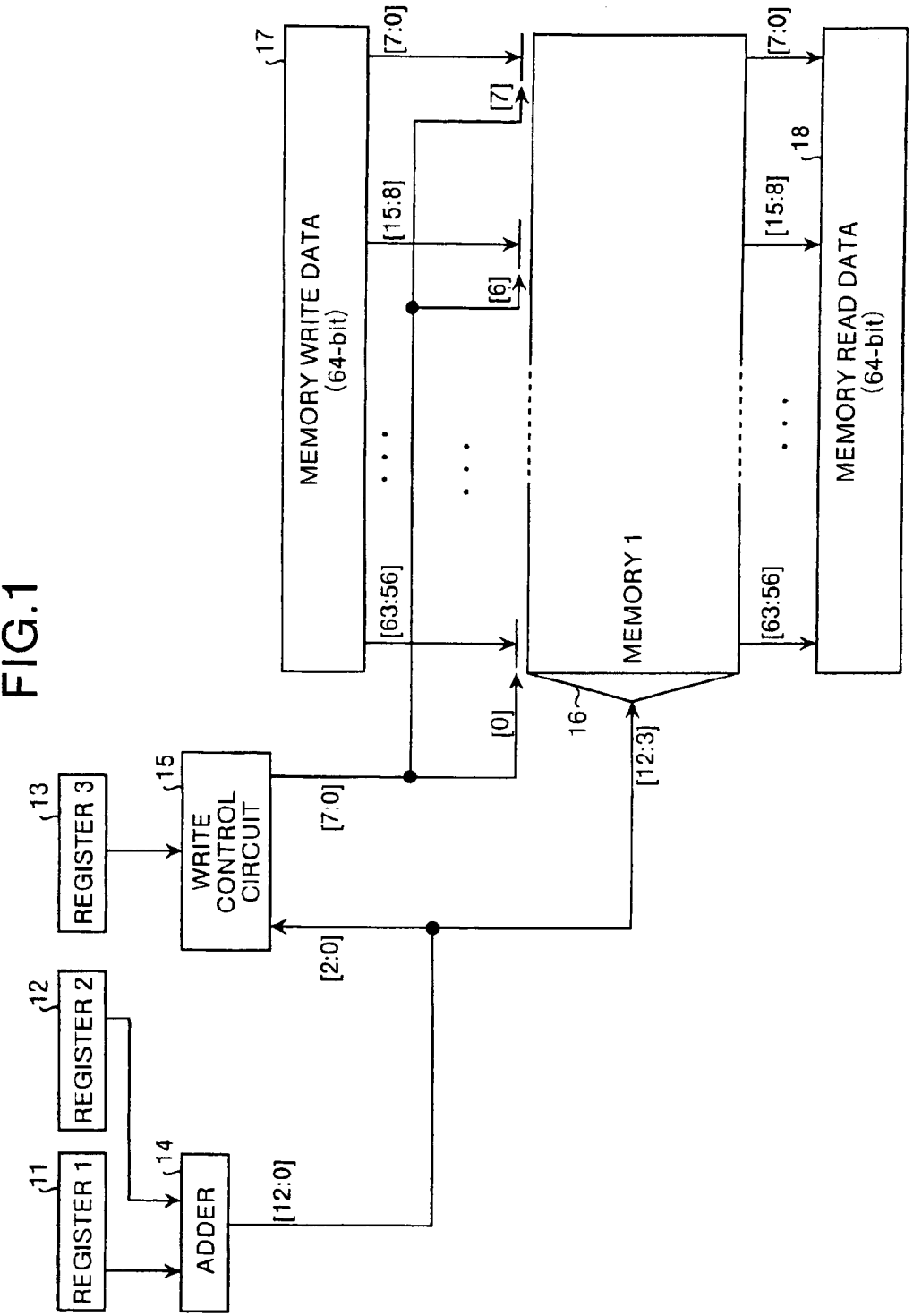
FIG. 1 is a block diagram showing the configuration for data reading or data writing in the conventional information processing device.
Figure 3:
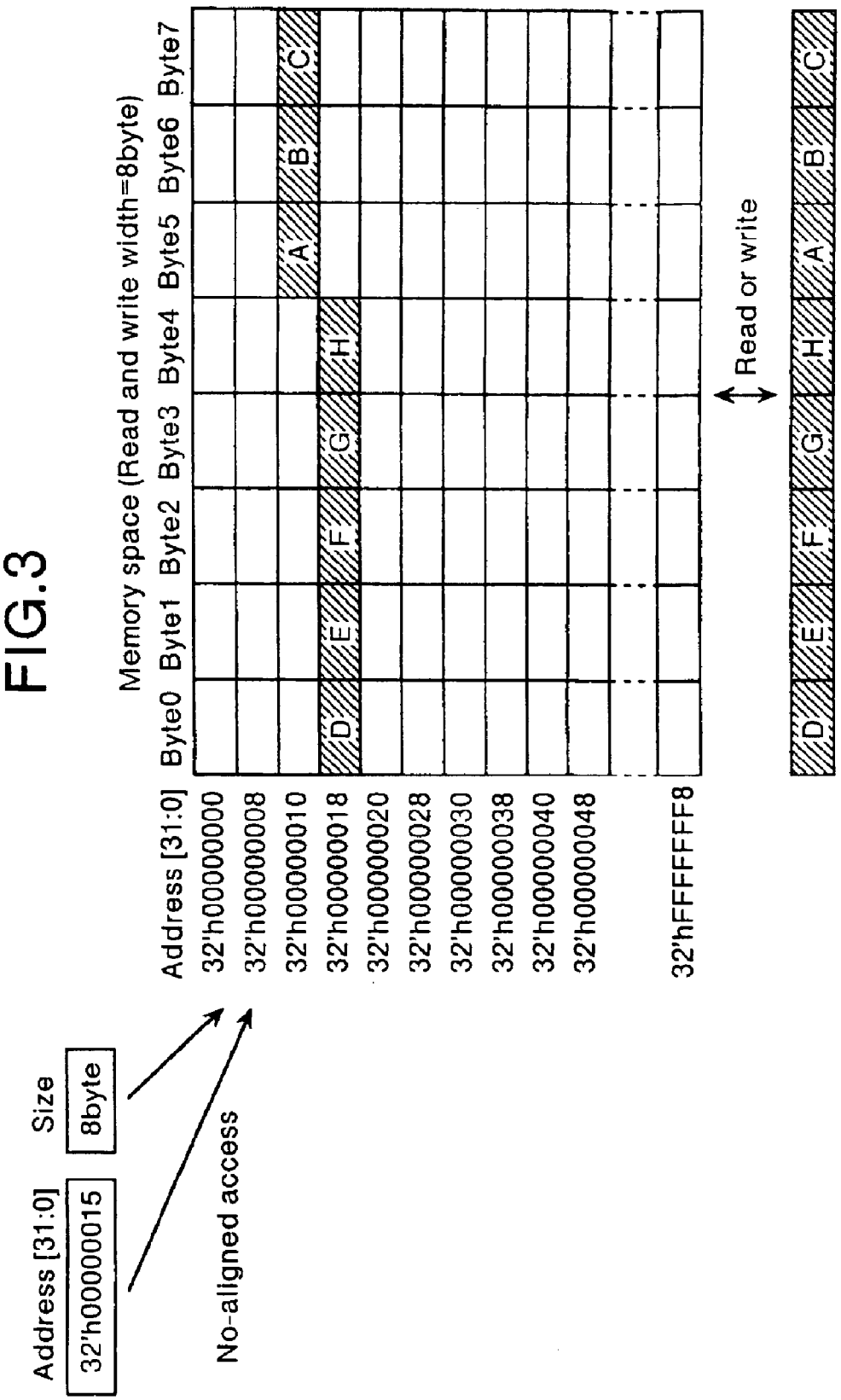
FIG. 3 is a schematic diagram for explaining the case where the addresses are aligned differently from those according to the specified data size.
Figure 4:
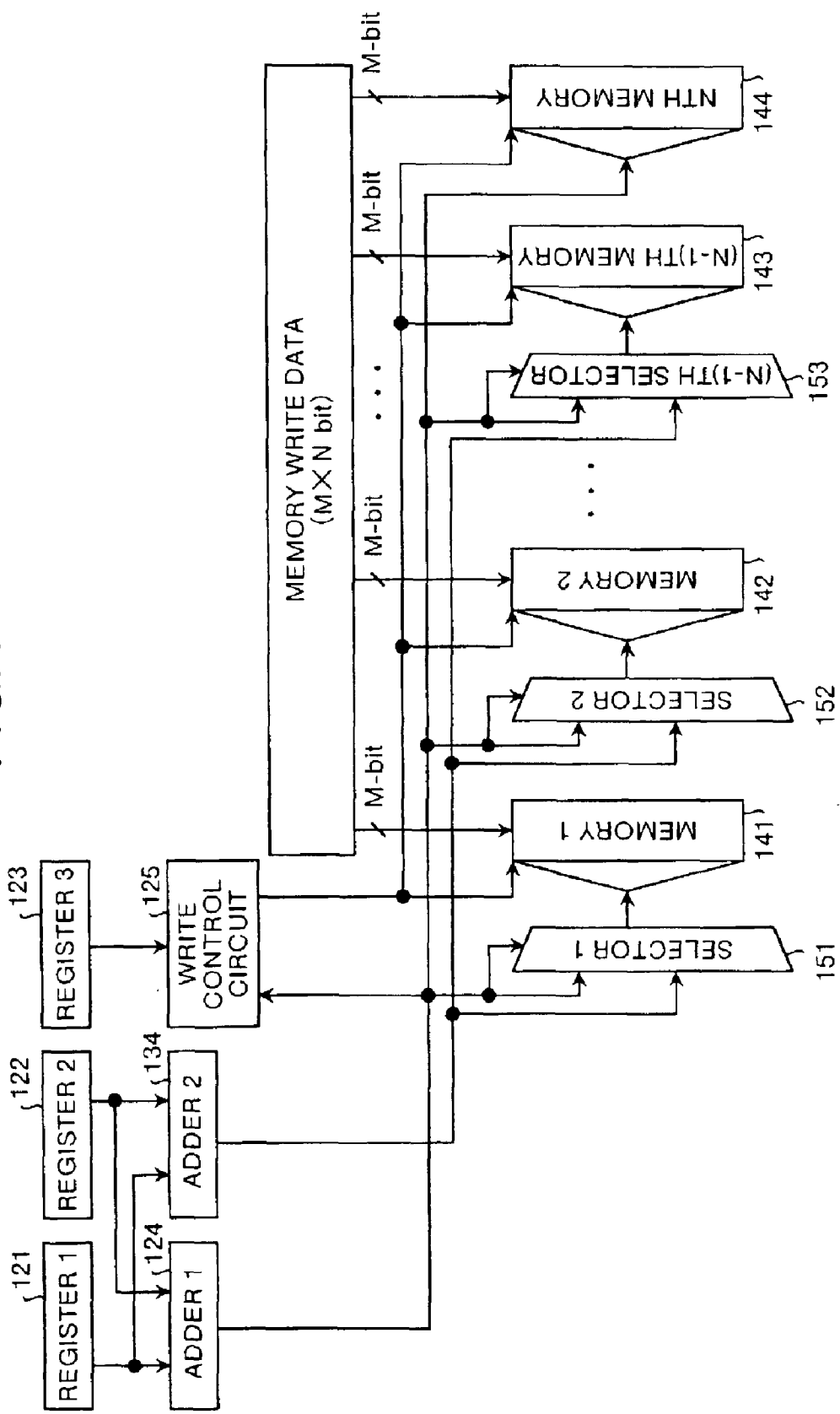
FIG. 4 is a block diagram showing a principle of a configuration for data writing in the information processing device according to the present invention.
Figure 5:
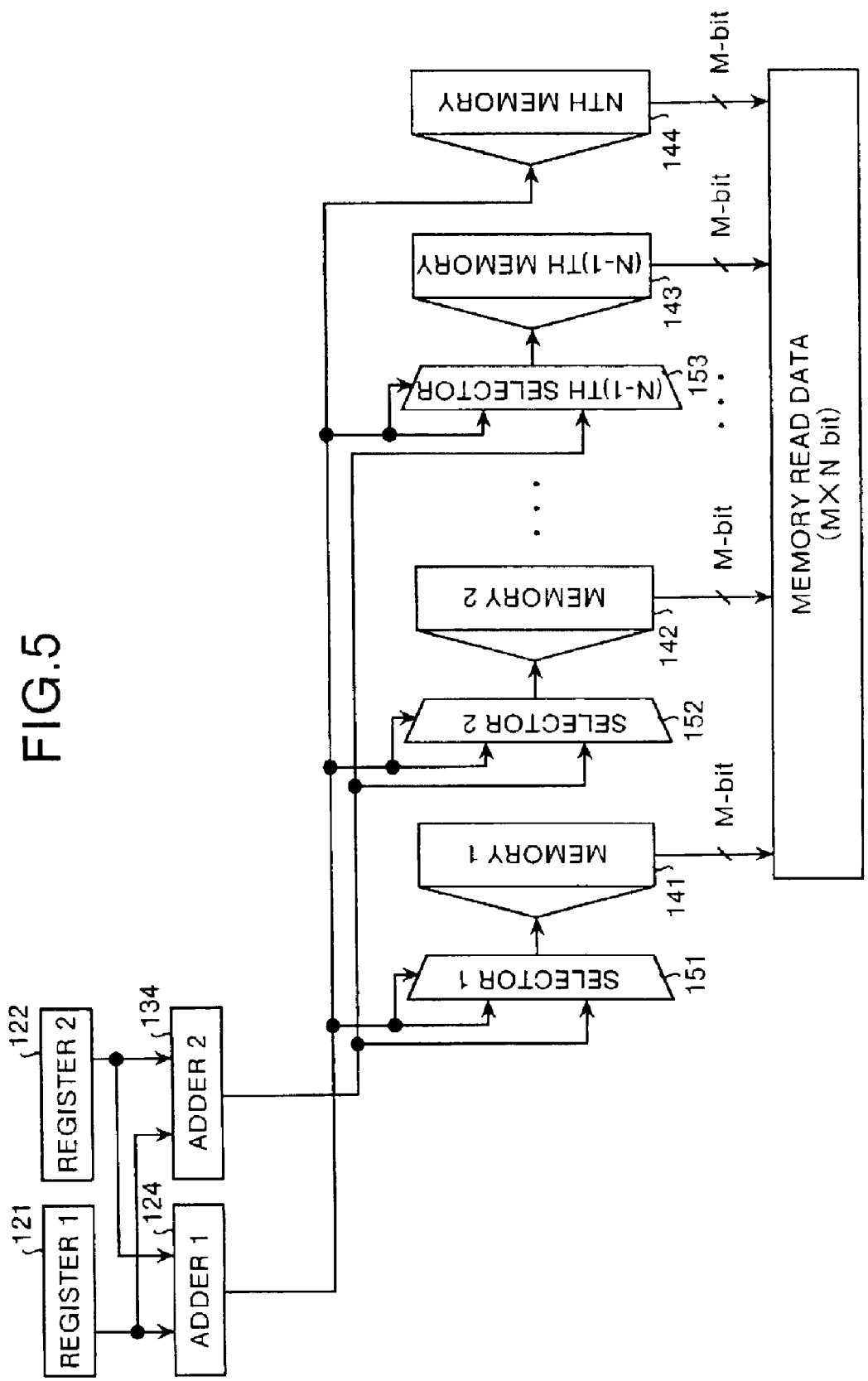
FIG. 5 is a block diagram showing a principle of a configuration for data reading in the information processing device according to the present invention.

When the access size is Double word, the values of all the bits of [7] to [0] become 1 with regard to the write control signal Therefore, referring to the example in FIG. 3, 8-byte memory write data 27 are written into consecutive 5-byte address locations starting from an address such as 32'h00000003, and consecutive 3-byte address locations starting from an address such as 32'h00000000 that are determined by the next base address after the 8-byte boundary set in the memory.

At data reading, 8-byte data are read as memory read data 28. More specifically, the 8-byte data correspond to consecutive 5-byte address locations starting from an address such as 32'h00000003, and consecutive 3-byte address locations starting from an address such as 32'h00000000 that are determined by the next base address after the 8-byte boundary set in the memory, and are used for processing in the processor.

When, in 3 bits of [2:0] which have been output from the first address adder 24, only the value of a bit of [2] is 1, and the values of the other bits are zero, the first selector 51, and the second to the fourth selectors select the values of [5:3] supplied from the second address adder 34, and the fifth selector, the sixth selector, and the seventh selector 57 select the values of [5:3] supplied from the first address adder 24. Further, when the access size is Byte, only the value of a bit of [3] becomes 1, and the values of the other bits become zero with regard to the write control signal. Accordingly, referring to the example in FIG. 3, 1-byte memory write data 27 are written into 1-byte address locations starting from an address such as 32'h00000004, 32'h0000000C, 32'h00000014, or 32'h0000001C (hereinafter, called as an address such as 32'h00000004).

At data reading, 8-byte data are read as memory read data 28. More specifically, the 8-byte data correspond to consecutive 4-byte address locations starting from an address such as 32'h00000004, and consecutive 4-byte address locations starting from an address such as 32'h00000000 that are determined by the next base address after the 8-byte boundary set in the memory. In the above data, 1-byte data starting from an address such as 32'h00000004 are used for processing in the processor.

When the access size is Half word, only the values of bits of [3] and [2] become 1, and the values of the other bits become zero with regard to the write control signal. Accordingly, referring to the example in FIG. 3, 2-byte memory write data 27 are written into consecutive 2-byte address locations starting from an address such as 32'h00000004.

At data reading, 8-byte data are read as memory read data 28. More specifically, the 8-byte data correspond to consecutive 4-byte address locations starting from an address such as 32'h00000004, and consecutive 4-byte address locations of an address such as 32'h00000000 that are determined by the next base address after the 8-byte boundary set in the memory. In the above data, 2-byte data starting from an address such as 32'h00000004 are used for processing in the processor.

When the access size is Word, only the values of each bit of [3] to [0] become 1, and the values of the other bits become zero with regard to the write control signal.

Accordingly, referring to the example in FIG. 3, 4-byte memory write data 27 are written into 4-byte address locations starting from an address such as 32'h00000004.

At data reading, 8-byte data are read as memory read data 28. More specifically, the 8-byte data correspond to consecutive 4-byte address locations starting from an address such as 32'h00000004, and consecutive 4-byte address locations starting from an address such as 32'h00000000 that are determined by the next base address after the 8-byte boundary set in the memory. In the above data, 4-byte data starting from an address such as 32'h00000004 are used for processing in the processor.

When the access size is Double word, the values of all the bits of [7] to [0] become 1 with regard to the write control signal. Therefore, referring to the example in FIG. 3, 8-byte memory write data 27 are written into consecutive 4-byte address locations starting from an address such as 32'h00000004, and consecutive 4-byte address locations starting from an address such as 32'h00000000 that are determined by the next base address after the 8-byte boundary set in the memory.

At data reading, 8-byte data are read as memory read data 28. More specifically, the 8-byte data correspond to consecutive 4-byte address locations starting from an address such as 32'h00000004, and consecutive 4-byte address locations starting from an address such as 32'h00000000 that are determined by the next base address after the 8-byte boundary set in the memory, and are used for processing in the processor.

When, in 3 bits of [2:0] which have been output from the first address adder 24, the values of bits of [2] and [0] are 1, and the value of a bit of [1] is zero, the first selector 51 and the second to the fifth selectors select the values of [5:3] supplied from the second address adder 34, and the sixth selector and the seventh selector 57 select the values of [5:3] supplied from the first address adder 24. Further, when the access size is Byte, only the value of a bit of [2] becomes 1, and the values of the other bits become zero with regard to the write control signal. Accordingly, referring to the example in FIG. 3, 1-byte memory write data 27 are written into 1-byte address locations starting from an address such as 32'h00000005, 32'h00000000, 32'h00000015, or 32'h0000001D (hereinafter, called as an address such as 32'h00000005).

At data reading, 8-byte data are read as memory read data 28. More specifically, the 8-byte data correspond to consecutive 3-byte address locations starting from an address such as 32'h00000005, and consecutive 5-byte address locations starting from an address such as 32'h00000000 that are determined by the next base address after the 8-byte boundary set in the memory. In the above data, 1-byte data starting from an address such as 32'h00000005 are used for processing in the processor.

When the access size is Half word, only the values of bits of [2] and [1] become 1, and the values of the other bits become zero with regard to the write control signal. Therefore, referring to the example in FIG. 3, 2-byte memory write data 27 are written into 2-byte address locations starting from an address such as 32'h00000005.

At data reading, 8-byte data are read as memory read data 28. More specifically, the 8-byte data correspond to consecutive 3-byte address locations starting from an address such as 32'h00000005, and consecutive 5-byte address locations starting from an address such as 32'h00000000 that are determined by the next base address after the 8-byte boundary set in the memory. In the above data, 2-byte data starting from an address such as 32'h00000005 are used for processing in the processor.

When the access size is Word, the values of each bit of [7] and [2] to [0] become 1, and the values of the other bits become zero with regard to the write control signal. Therefore, referring to the example in FIG. 3, 4-byte memory write data 27 are written into consecutive 3-byte address locations starting from an address such as 32'h00000005, and 1-byte address locations starting from an address such as 32'h that are determined by the next base address after the 8-byte boundary set in the memory.

At data reading, 8-byte data are read as memory read data 28. More specifically, the 8-byte data correspond to consecutive 3-byte address locations starting from an address such as 32'h00000005, and consecutive 5-byte address locations starting from an address such as 32'h00000000 that are determined by the next base address after the 8-byte boundary set in the memory. In the above data, consecutive 3-byte data starting from an address such as 32'h00000005 and the next 1-byte data starting from an address such as 32'h00000000 are used for processing in the processor.

When the access size is Double word, the values of all the bits of [7] to [0] become 1 with regard to the write control signal. Therefore, referring to the example in FIG. 3, 8-byte memory write data 27 are written into consecutive 3-byte address locations starting from an address such as 32'h00000005, and consecutive 5-byte address locations starting from an address such as 32'h00000000 that are determined by the next base address after the 8-byte boundary set in the memory.

At data reading, 8-byte data are read as memory read data 28. More specifically, the 8-byte data correspond to consecutive 3-byte address locations starting from an address such as 32'h00000005, and consecutive 5-byte address locations starting from an address such as 32'h00000000 that are determined by the next base address after the 8-byte boundary set in the memory, and are used for processing in the processor. In the example shown in FIG. 3, the 8-byte data corresponds to consecutive 3-byte address locations of 32'H00000015 to 32'H00000017, and consecutive 5-byte address locations of 32'H00000018 to 32'H0000001C, which are the next base address.

When, in 3 bits of [2:0] which have been output from the first address adder 24, the values of bits of [2] and [1] are 1, and the value of a bit of [0] is zero, the first selector 51, and the second to the sixth selectors select the values of [5:3] supplied from the second address adder 34, and the seventh selector 57 selects the values of [5:3] supplied from the first address adder 24. Further, when the access size is Byte, only the value of a bit of [2] becomes 1, and the values of the other bits become zero with regard to the write control signal. Accordingly, referring to the example in FIG. 3, 1-byte memory write data 27 are written into 1-byte address locations starting from an address such as 32'h00000006, 32'h0000000E, 32'h00000016, and 32'h0000001E (hereinafter, called as an address such as 32'h00000006).

At data reading, 8-byte data are read as memory read data 28. More specifically, the 8-byte data correspond to consecutive 2-byte address locations starting from an address such as 32'h00000006, and consecutive 6-byte address locations starting from an address such as 32'h00000000 that are determined by the next base address after the 8-byte boundary set in the memory. In the above data, 1-byte data starting from an address such as 32'h00000006 are used for processing in the processor.

When the access size is Half word, only the values of bits of [1] and [0] become 1, and the values of the other bits become zero with regard to the write control signal. Accordingly, referring to the example in FIG. 3, 2-byte memory write data 27 are written into consecutive 2-byte address locations starting from an address such as 32'h00000006.

At data reading, 8-byte data are read as memory read data 28. More specifically, the 8-byte data correspond to consecutive 2-byte address locations starting from an address such as 32'h00000006, and consecutive 6-byte address locations starting from an address such as 32'h00000000 that are determined by the next base address after the 8-byte boundary set in the memory. In the above data, 2-byte data starting from an address such as 32'h00000006 are used for processing in the processor.

When the access size is Word, the values of each bit of [7], [6], [1], and [0] become 1, and the values of the other bits become zero with regard to the write control signal. Therefore, referring to the example in FIG. 3, 4-byte memory write data 27 are written into consecutive 2-byte address locations starting from an address such as 32'h00000006, and consecutive 2-byte address locations starting from an address such as 32'h00000000 that are determined by the next base address after the 8-byte boundary set in the memory.

At data reading, 8-byte data are read as memory read data 28. More specifically, the 8-byte data correspond to consecutive 2-byte address locations starting from an address such as 32'h00000006, and consecutive 6-byte address locations from an address such as 32'h00000000 that are determined by the next base address after the 8-byte boundary set in the memory. In the above data, 2-byte data starting from an address such as 32'h00000006 and 2-byte data starting from an address such as 32'h00000000 are used for processing in the processor.

When the access size is Double word, the values of all the bits of [7] to [0] become 1 with regard to the write control signal. Therefore, referring to the example in FIG. 3, 8-byte memory write data 27 are written into consecutive 2-byte address locations starting from an address such as 32'h00000006, and consecutive 6-byte address locations starting from an address such as 32'h00000000 that are determined by the next base address after the 8-byte boundary set in the memory.

At data reading, 8-byte data are read as memory read data 28. More specifically, the 8-byte data correspond to consecutive 2-byte address locations starting from an address such as 32'h00000006, and consecutive 6-byte address locations starting from an address such as 32'h00000000 that are determined by the next base address after the 8-byte boundary set in the memory, and are used for processing in the processor.

When, the values of each bit of [2:0] which have been output from the first address adder 24 are 1, all the selectors 51 to 57 select the values of [5:3] supplied from the second address adder 34. When the access size is Byte, only the value of a bit of [0] becomes 1, and the values of the other bits become zero with regard to the write control signal. Accordingly, referring to the example in FIG. 3, 1-byte memory write data 27 are written into 1-byte address locations starting from an address such as 32'h00000007, 32'h0000000F, 32'h00000017, or 32'h0000001F (hereinafter, called as an address such as 32'h00000007).

At data reading, 8-byte data are read as memory read data 28. More specifically, the 8-byte data correspond to 1-byte address locations starting from an address such as 32'h00000007, and consecutive 7-byte address locations starting from an address such as 32'h00000000 that are determined by the next base address after the 8-byte boundary set in the memory. In the above data, 1-byte data starting from an address such as 32'h000000007 are used for processing in the processor.

When the access size is Half word, only the values of bits of [7] and [0] become 1, and the values of the other bits become zero with regard to the write control signal. Therefore, referring to the example in FIG. 3, 2-byte memory write data 27 are written into 1-byte address locations starting from an address such as 32'h00000007, and 1-byte address locations starting from an address such as 32'h00000000 that are determined by the next base address after the 8-byte boundary set in the memory.

At data reading, 8-byte data are read as memory read data 28. More specifically, the 8-byte data correspond to 1-byte address locations starting from an address such as 32'h00000007, and consecutive 7-byte address locations starting from an address such as 32'h00000000 that are determined by the next base address after the 8-byte boundary set in the memory. In the above data, 1-byte data starting from an address such as 32'h00000007 and the next 1-byte data starting from an address such as 32'h00000000 are used for processing in the processor.

When the access size is Word, the values of bits of [7] to [5], and [0] become 1, and the values of the other bits become zero with regard to the write control signal. Therefore, referring to the example in FIG. 3, 4-byte memory write data 27 are written into 1-byte address locations starting from an address such as 32'h00000007, and consecutive 3-byte address locations starting from an address such as 32'h00000000 that are determined by the next base address after the 8-byte boundary set in the memory.

At data reading, 8-byte data are read as memory read data 28. More specifically, the 8-byte data correspond to 1-byte address locations starting from an address such as 32'h00000007, and consecutive 7-byte address locations starting from an address such as 32'h00000000 that are determined by the next base address after the 8-byte boundary set in the memory. In the above data, 1-byte data starting from an address such as 32'h00000007 and the next 3-byte data starting from an address such as 32'h00000000 are used for processing in the processor.

When the access size is Double word, the values of all the bits of [7] to [0] become 1 with regard to the write control signal. Therefore, referring to the example in FIG. 3, 8-byte memory write data 27 are written into 1-byte address locations starting from an address such as 32'h00000007, and consecutive 7-byte address locations starting from an address such as 32'h00000000 that are determined by the next base address after the 8-byte boundary set in the memory.

At data reading, 8-byte data are read as memory read data 28. More specifically, the 8-byte data correspond to 1-byte address locations starting from an address such as 32'h00000007, and consecutive 7-byte address locations starting from an address such as 32'h00000000 that are determined by the next base address after the 8-byte boundary set in the memory, and are used for processing in the processor.

According to the above embodiment, even when write data cross over the 8-byte boundary, necessary data can be written at one-time memory-access by switching the addresses to be supplied to the memory corresponding to a target address for write, and the size of write data.

According to the above embodiment, even when the size of data to be read from the memory cross over the 8-byte boundary, necessary data can be read at one-time memory-access by switching the addresses to be supplied to the memory corresponding to an address at which read data is stored, and the size of the read data. Accordingly, even when the addresses are aligned differently from those according to the size of the data specified at data reading or data writing, the data can be read or written at one-time memory-access.

The present invention may be applied not only to data reading or data writing from or into the cache memory with the above-described configuration, but also to address selection at data reading or data writing from or into a memory such as RAM or ROM. Moreover, the present invention may be applied not only to the cache memory according to the direct map method, but also to a cache memory according to a set associative method.

The numerical values concerning the above-described addresses, sizes, and the like are only one example, and various kinds of modifications may be executed, although the above block size has been assumed to be of 64 bytes for description in the above-described embodiment, the block size of the cache memory may be of any size except for 64 bytes. In such a case, the address selected by each selector and the bit width of the output of the second address adder may be increased or decreased according to the size of the block.

Figure 8:
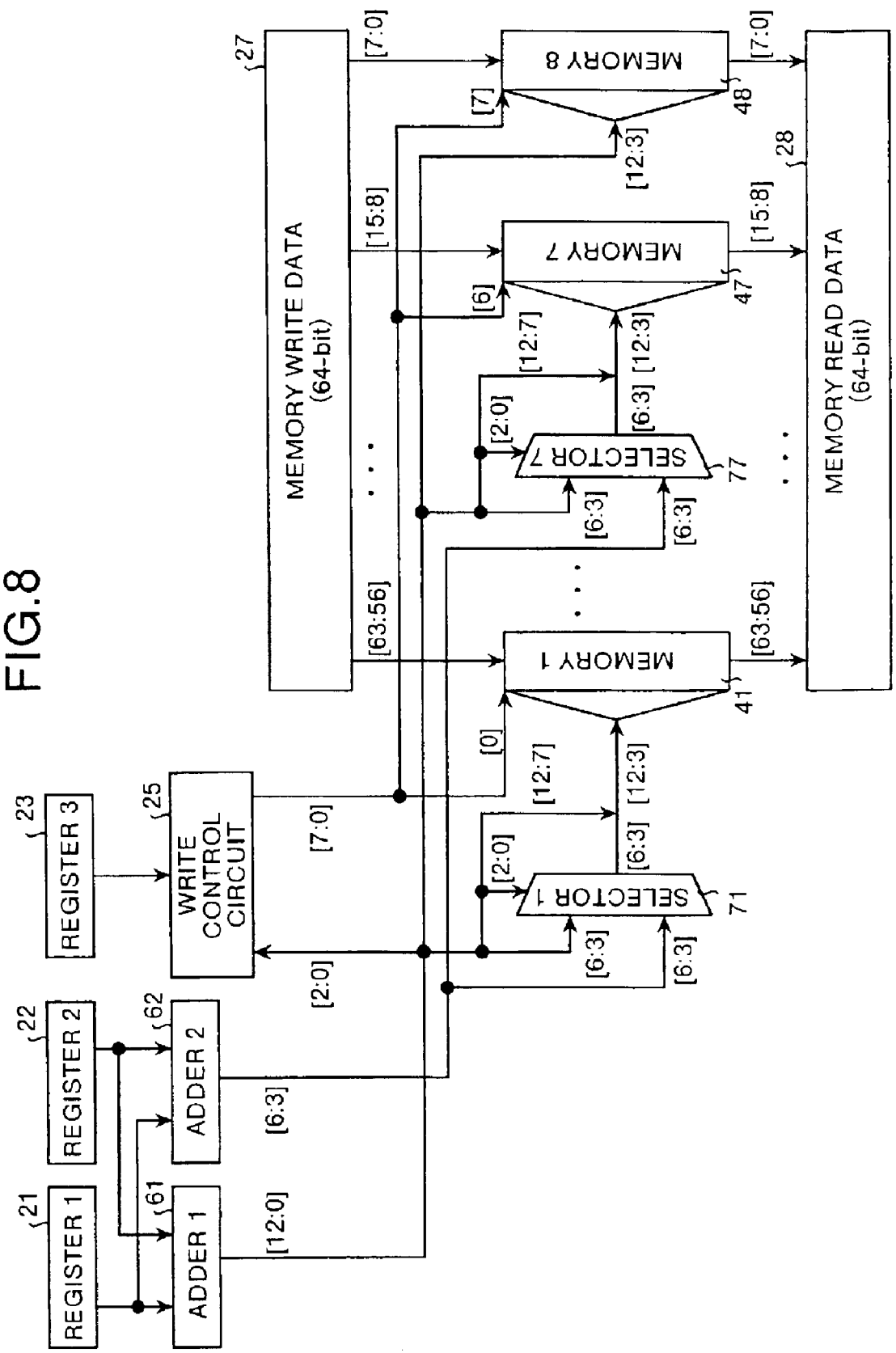
FIG. 8 is a block diagram showing another example of the configuration for data reading or data writing in the information processing device according to the embodiment.

FIG. 8 shows a configuration in which the block size of a cache memory is of 128 bytes. A second address adder 62 supplies the values of bits of [6:3] in generated addresses to selectors 71 to 77. A first address adder 61 also supplies the values of bits of [6:3] in the generated addresses to the selectors 71 to 77. The other components are the same as those of the above-described configuration in which the block size is of 64 bytes.

According to the present invention, even when the size of write data cross over an M×N boundary, necessary data can be written at one-time memory access by switching addresses to be supplied to a memory, based on a target addresses for write and a size of the write data.

Even when the size of read data cross over the M×N-bit boundary, necessary data can be read at one-time memory access by switching addresses to be supplied to the memory, based on an address at which the read data have been stored and the size of the read data. Accordingly, it is possible to obtain the device and method for information processing by which data can be read or written at one-time memory-access, even when addresses are aligned differently from those according to the size of the data specified at data reading or data writing.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An information processing device provided with a memory consisting of N memory areas with a M-bit width and having a M×N-bit write width where M and N are natural numbers, the information processing device comprising:

a first register that stores first data to generate addresses;

a second register that stores second data to generate addresses;

a third register that stores data sizes to be written;

a first address adder that generates a first address, based on the data stored in the first register and the data stored in the second register;

a second address adder that generates a second address by adding N to the first address;

a write control circuit that generates write control signals for the N memory areas, based on the first address and the data sizes to be written;

(N−1) selectors that select either the first address or the second address;

(N−1)th memory areas into which data is written, based on the addresses supplied from the selectors and the write control signals; and the Nth memory area into which data is written, based on the first address and the write control signals, wherein, when integers represented by low-order 3 bits in the first address are K in the case of N=8,
all the selectors select the first address when K=0;
the first to the K-th selectors select the second address, and the (K+1)th to the seventh selectors select the first address, when $1 \leq K \leq 6$; and
all the selectors select the second address when K=7.

2. An information processing device provided with a memory consisting of N memory areas with a M-bit width and having a M×N-bit write width where M and N are natural numbers, the information processing device comprising:
a first register that stores first data to generate addresses;
a second register that stores second data to generate addresses;
a third register that stores data sizes to be written;
a first address adder that generates a first address, based on the data stored in the first register and the data stored in the second register;
a second address adder that generates a second address by adding N to the first address;
a write control circuit that generates write control signals for the N memory areas, based on the first address and the data sizes to be written;
(N−1) selectors that select either the first address or the second address;
(N−1)th memory areas into which data is written, based on the addresses supplied from the selectors and the write control signals; and
the Nth memory area into which data is written, based on the first address and the write control signals,
wherein, when integers represented by low-order 3 bits in the first address are K in the case of N=8 and the data sizes to be written are of J-bytes,
the write control circuit allows
the (K+1)th to the (K+J)th memory areas to be in a writable state when $1 \leq (K+J) \leq 8$, and
the (K+1)th to the eighth memory areas, and the first to the (K+J-8)th memory areas to be in a writable state when $(K+J) \geq 9$.

3. An information processing device provided with a memory consisting of N memory areas with a M-bit width and having a M×N-bit write width where M and N are natural numbers, the information processing device comprising:
a first register that stores first data to generate addresses;
a second register that stores second data to generate addresses;
a third register that stores data sizes to be written;
a first address adder that generates a first address, based on the data stored in the first register and the data stored in the second register;
a second address adder that generates a second address by adding N to the first address;
(N−1) selectors that select either the first address or the second address;
(N−1)th memory areas from which data is read, based on the addresses supplied from the selectors; and
the Nth memory area from which data is read, based on the first address,
wherein, when integers represented by low-order 3 bits in the first address are K in the case of N=8,
all the selectors select the first address when K=0;
the first to the K-th selectors select the second address, and the (K+1)th to the seventh selectors select the first address, when $1 \leq K \leq 6$; and
all the selectors select the second address when K=7.

4. An information processing device provided with a memory consisting of N memory areas with a M-bit width and having a M×N-bit write width where M and N are natural numbers, the information processing device comprising:
a first register that stores first data to generate addresses;
a second register that stores second data to generate addresses;
a third register that stores data sizes to be written;
a first address adder that generates a first address, based on the data stored in the first register and the data stored in the second register;
a second address adder that generates a second address by adding N to the first address;
(N−1) selectors that select either the first address or the second address;
(N−1)th memory areas from which data is read, based on the addresses supplied from the selectors; and
the Nth memory area from which data is read, based on the first address,
wherein, when integers represented by low-order 3 bits in the first address are K in the case of N=8 and the data sizes to be written are of J-bytes,
the write control circuit allows
the (K+1)th to the (K+J)th memory areas to be in a writable state when $1 \leq (K+J) \leq 8$, and
the (K+1)th to the eighth memory areas, and the first to the (K+J-8)th memory areas to be in a writable state when $(K+J) \geq 9$.

5. An information processing device provided with a memory consisting of N memory areas with a M-bit width and having a M×N-bit write width where M and N are natural numbers, the information processing device comprising:
a first register that stores first data to generate addresses;
a second register that stores second data to generate addresses;
a third register that stores data sizes to be written;
a first address adder that generates a first address, based on the data stored in the first register and the data stored in the second register;
a second address adder that generates a second address by adding N to the first address;
a write control circuit that generates write control signals for the N memory areas, based on the first address and the data sizes to be written;
(N−1) selectors that select either the first address or the second address;
(N−1)th memory areas into which data is written based on the addresses supplied from the selectors and the write control signals, or from which data is read based on the addresses supplied from the selectors; and
the Nth memory area into which data is written based on the first address and the write control signals, or from which data is read based on the first address,
wherein, when integers represented by low-order 3 bits in the first address are K in the case of N=8,
all the selectors select the first address when K=0;
the first to the K-th selectors select the second address, and the (K+1)th to the seventh selectors select the first address, when $1 \leq K \leq 6$; and all the selectors select the second address when K=7.

6. An information processing device provided with a memory consisting of N memory areas with a M-bit width and having a M×N-bit write width where M and N are natural numbers, the information processing device comprising:

- a first register that stores first data to generate addresses;
- a second register that stores second data to generate addresses;
- a third register that stores data sizes to be written;
- a first address adder that generates a first address, based on the data stored in the first register and the data stored in the second register;
- a second address adder that generates a second address by adding N to the first address;
- a write control circuit that generates write control signals for the N memory areas, based on the first address and the data sizes to be written;
- (N−1) selectors that select either the first address or the second address;
- (N−1)th memory areas into which data is written based on the addresses supplied from the selectors and the write control signals, or from which data is read based on the addresses supplied from the selectors; and
- the Nth memory area into which data is written based on the first address and the write control signals, or from which data is read based on the first address, wherein, when integers represented by low-order 3 bits in the first address are K in the case of N=8 and the write sizes are of J-bytes, the write control circuit allows the (K+1)th to the (K+J)th memory areas to be in a writable state when $1 \leq (K+J) \leq 8$, and the (K+1)th to the eighth memory areas, and the first to the (K+J-8)th memory areas to be in a writable state when $(K+J) \geq 9$.

* * * * *